United States Patent [19]

Dunning et al.

[11] 4,101,698
[45] Jul. 18, 1978

[54] ELASTOMERIC REFLECTIVE METAL SURFACES

[75] Inventors: Richard E. Dunning, Munster, Ind.; Victor H. Rampelberg, Flossmoor, Ill.

[73] Assignee: Avery International Corp., San Marino, Calif.

[21] Appl. No.: 595,547

[22] Filed: Jul. 14, 1975

[51] Int. Cl.$^2$ .............................................. B60R 13/00
[52] U.S. Cl. ...................................... 428/31; 427/404; 427/290; 428/204; 428/209; 428/344; 428/425; 428/40; 428/914; 156/230
[58] Field of Search ................... 428/31, 33, 349, 423, 428/195, 379, 40, 344, 462, 425, 204; 427/123–124, 404, 89; 52/716–717; 296/1 R, 28 R, 29, 31 P; 293/71, 98, DIG. 4, 62; 350/109

[56] References Cited

U.S. PATENT DOCUMENTS

| | | | |
|---|---|---|---|
| 2,039,372 | 5/1936 | Wickmann | 428/148 X |
| 2,680,695 | 6/1954 | Judd | 427/299 X |
| 3,076,727 | 2/1963 | Harwig | 427/404 X |
| 3,152,950 | 10/1964 | Palmquist et al. | 428/462 X |
| 3,223,554 | 12/1965 | Newman | 427/124 X |
| 3,493,257 | 2/1970 | Fitzgerald et al. | 296/31 P |
| 3,590,768 | 7/1971 | Shanok | 296/28 R |
| 3,687,792 | 8/1972 | Ruff | 52/716 X |
| 3,720,567 | 3/1973 | Shanok et al. | 428/31 X |
| 3,744,835 | 7/1973 | Carbone et al. | 293/71 R X |
| 3,770,545 | 11/1973 | Jackson | 52/716 X |
| 3,843,475 | 10/1974 | Kent | 52/716 X |
| 3,915,809 | 10/1975 | Wheatley | 427/404 X |

*Primary Examiner*—George F. Lesmes
*Assistant Examiner*—Alexander S. Thomas
*Attorney, Agent, or Firm*—Christie, Parker & Hale

[57] ABSTRACT

An elastomeric transfer laminate for providing decorative reflective metal finishes on the outer surfaces of articles of various shapes includes an effectively transparent elastomeric layer, such as polyurethane film, and a layer of highly reflective metal, such as chromium, bonded to the elastomeric layer. The metal is applied in microscopically discontinuous quantities, but in an amount to form an apparently visually continuous, planar, highly reflective surface. A typical technique is vapor deposition. The elastomeric layer provides an effectively transparent protective outer covering for the reflective metal layer when the laminate is bonded to a substrate. The laminate can be stretched to conform to three-dimensional shapes, and bonded to an elastomeric substrate, such as urethane rubber, to produce an article having a reflective metal surface which can be distorted temporarily during use without disrupting the reflectivity of the metal layer.

12 Claims, 10 Drawing Figures

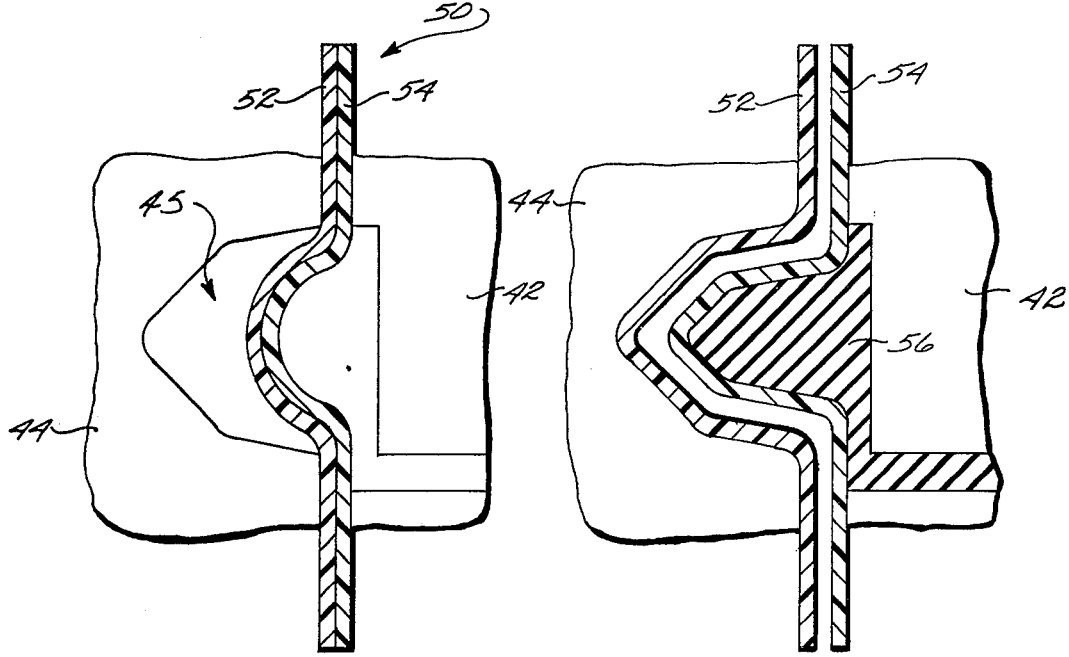

ELASTOMERIC REFLECTIVE METAL SURFACES

BACKGROUND

This invention relates to decorative laminates, and more particularly to a transfer laminate for forming elastomeric reflective metal surfaces on articles of manufacture.

In the past, highly reflective metal surfaces have been used on many decorative articles. A typical use is in metal bumpers and trim parts for automobiles. Chrome plating is chiefly used because of its high reflectivity, corrosion resistance, and abrasion resistance.

Because of the recent federal laws requiring impact-absorbing bumpers on motor vehicles, bumpers on some late-model automobiles have been made from elastomeric materials such as urethane rubber. These bumpers have advantages over their chrome-plated counterparts in terms of lighter weight, resistance to corrosion, and ability to absorb impact by deforming temporarily without being permanently damaged. Such bumpers are typically made from pigmented rubber without the common bright reflective metal surfaces. Despite their disadvantages, the standard chrome-plated metal bumpers are still used in many automobiles where the bright reflective metal finishes are more desirable.

The reflective metal trim parts on automobiles are typically made from metal castings which are chrome-plated and commonly attached to the automobile body by metal clips or fasteners. The disadvantages of such trim parts include the additional weight added to the automobile, time-consuming and relatively expensive attachment techniques, and corrosion problems resulting because the trim parts are made from a metal which is different from that of the automobile body and thereby causes corrosion from electrolysis of the dissimilar metals. Despite these problems, chrome-plated metal trim parts continue in use today, at least in part because of the relative ease with which differently shaped surface configurations can be plated with highly reflective, abrasion-resistant and corrosion-resistant metals such as chrome.

SUMMARY

This invention is based on the recognition that a metallized elastomeric laminate can provide a bright reflective finish on deformable articles, such as impact-absorbing bumpers of automobiles, and also provide bright reflective surfaces on molded parts of three-dimensional shapes as an alternative to chrome plating.

Briefly, the invention provides a transfer laminate having a flexible transparent, or translucent, elastomeric layer, and a layer of metal bonded to the elastomeric layer in separate microscopically discontinuous planar quantities of high reflectivity. The metal layer is deposited so it forms an apparent visually continuous reflective surface. The metallized elastomeric layer is attached to a substrate, either by an adhesive, or by being integrally bonded to the substrate surface, to provide a reflective metal finish which is capable of being deformed. The laminate can either be used as an impact-absorbing surface which distorts and returns to its original position, without destroying the reflectivity of the metal surface; or it can be distorted sufficiently to provide a reflective metal surface finish for three-dimensional contoured shapes, without disrupting the continuous reflectivity of the metallized surface.

The transparent, or translucent, elastomeric layer provides a protective outer covering for the metal layer which is bonded to the undersurface of the elastomeric layer. The metal is a highly reflective metal, especially one having good resistance to corrosion and abrasion. Chromium is the preferred metal, although other bright reflective metals capable of being vacuum-deposited can be used, such as nickel; nickel and chromium alloys such as Nichrome; alloys of iron and chromium, or iron, nickel and chromium, such as stainless steel; aluminum; alloys of aluminum, such as aluminum and chromium; tin; antimony; magnesium; indium; silver; platinum; rhodium; and palladium.

The elastomeric layer is a relatively thin, self-supporting film which is flexible and foldable, and is also capable of returning substantially to its original position when stretched or deformed. More specifically, the elastomeric layer is not only plastically deformable, i.e., able to be stretched or molded to certain shapes or contours under pressure, but it also must be sufficiently elastic to return to its original form after the deformation load is released. Thus, polyester films such as Du Pont's "Mylar," or plastic films such as polyethylene, or ABS are not suitable. On the other hand, the elastomeric sheet need not be one which is highly elastic, although one which is elastic within a wide range of deformation is desirable. Polyurethane film sheeting is the desired elastomeric sheet material.

The metal layer is applied to the elastomeric film in separate, discontinuous or captured, generally planar reflective segments, preferably being applied in individual microscopic dots by vacuum-deposition. The metal also can be applied by electroless plating techniques which deposit the metal on the film in essentially discrete selected areas of the film. The metal is deposited in an amount and in a manner which provides a visually continuous, planar, reflective metallized surface. However, since the metal is actually applied in microscopic captured reflective metal segments or dots, the metal is preserved in its highly reflective planar condition after the elastomeric layer, and its adhesive or bonding layer, stretch or deform and then return to its original form. In effect, the metal is in discrete particles which are free to float as islands. A non-elastomeric film does not move around enough to allow this phenomenon to occur.

To reinforce the opacity of the reflective metal layer, a separate opaque layer is applied to the undersurface of the metal layer. An appropriate adherence layer is then formed on the undersurface of the opaque layer for attaching the laminate to a substrate. The adherence layer can be a layer of adhesive, such as a pressure-sensitive, or heat-activated adhesive. The adhesive layer also may be pigmented and serve as the opaque layer in addition to the adherence layer. The laminate can be attached to the surface of a substrate by the adhesive, or it can be integrally bonded to the substrate by using a primer layer in place of the adhesive layer to improve the integral bond between the laminate and the substrate.

This invention provides an improvement over the common chrome-plated metal trim parts for automobiles, or other articles having three-dimensional surface configurations. For example, contoured trim parts which fit around the headlamps or tail lights of automobiles can be made from injection-molded plastic rather than metal castings. The metallized elastomeric laminate of this invention can be stretched to conform to the three-dimensional contoured surfaces of these plastic trim parts without disrupting the reflectivity of the metal layer.

The laminate also can provide a bright reflective metal finish on deformable articles such as articles subject to impacts. A typical use is for the impact-absorbing bumpers used in many late-model automobiles. For example, a laminate comprising a transparent elastomeric film and an undersurface of vacuum-deposited metal, such as chromium, can be integrally bonded to the molded elastomeric impact-absorbing article. In this instance, the laminate is placed in a mold cavity, and an elastomeric molding compound, such as urethane rubber, is injected into the mold cavity under pressure against the metallized layer to stretch the laminate so it conforms to the shape of the molded article and bonds to the outer surface of the article.

As an alternative, the metallized elastomeric transfer laminate can be part of a hot transfer sheet in which the laminate is releasably attached to a carrier. The heat and pressure of the molding operation can be used to separate the elastomeric laminate from the carrier in addition to bonding the laminate to a molded article.

The invention provides an end-product comprising an elastomeric molded article having an integrally bonded elastomeric reflective metal surface. The transparent elastomeric sheet provides a protective covering for the reflective metal layer, and also allows the metal layer to be distorted when the molded article is subject to impact, without disrupting the reflectivity of the metal layer.

These and other aspects of the invention will be more fully understood by referring to the following detailed description and the accompanying drawings.

DRAWINGS

FIG. 8 is a fragmentary schematic cross-sectional elevation view showing the laminate of this invention in the form of a hot transfer sheet in preparation for being bonded to the surface of an injection-molded article;

FIG. 9 is a fragmentary schematic cross-sectional elevation view showing an injection-molding machine in its closed position prior to injection-molding of a plastic molding compound against the laminate of FIG. 8; and FIG. 10 is a fragmentary schematic cross-sectional elevation view similar to FIG. 9 showing the injection-molding machine in its retracted open position in which the decorative portion of the laminate of FIG. 8 has been transferred to the injection-molded article and prior to the injection-molded article being removed from the mold.

DESCRIPTION

Figure 1:
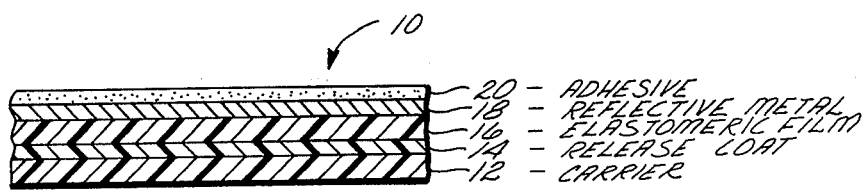
FIG. 1 is a fragmentary schematic cross-sectional elevation view showing a method of making one embodiment of the laminate according to this invention.

Referring to FIG. 1, an elastomeric laminate 10 according to this invention includes a carrier sheet 12 having a release coat 14 overlying the carrier sheet. A layer 16 of synthetic resinous elastomeric material, such as polyurethane, is coated over the release coating 14 to form a relatively thin, continuous, planar flexible and foldable elastomeric film or skin coat after the coating sets. A layer of metal 18, to be described in detail below, is applied to the surface of the elastomeric film 16.

Preferably, the carrier sheet 12 may be any carrier sheet or web. For example, it may be a polyester film sheet of polyethylene terephthalate, such as "Mylar" (trademark of Du Pont), or a polyester film such as "Melinex" (trademark of Imperial Chemical Industries), or a web of other plastic sheeting such as polyvinyl chloride, ABS, cellophane, or cellulose acetate.

The release layer 14 may be any conventional release coating, such as those having a wax, paraffin or silicone base, for enabling the carrier 12 to be stripped from the elastomeric film 16.

The elastomeric film 16 preferably is a relatively thin, flexible and foldable sheet which is capable of being stretched or deformed to a desired shape under pressure, but will return to substantially its original shape after the stretching or deformation force is released. The elasticity of the film 16 may be the type which has a "memory," i.e., is capable upon removal of a deforming load, of returning to its "set" configuration with time and relaxation. The flexible or stretchable materials to be avoided are those which stretch readily, with slight deformation, beyond their elastic limit. Preferably, the elastomeric film 16 is transparent, or at least translucent, relatively durable and not relatively abradable. The elastomeric film 16 also has a sufficient refractive index when transparent to allow the metal layer 18 to appear as though it is a surface layer and a smooth skin, so as not to disrupt reflection from the metal layer 18. The preferred elastomer is a thermoplastic or thermosetting polyurethane film. Other plastic films such as polyvinyl butyral, polyvinyl acetal, transparent vinyls such as polyvinyl chloride, flexible polypropylenes or polyacrylates, Mylar, or Melinex are not suitable. These films are extensible for the most part, but they do not have the elastomeric qualities necessary for the present invention. Natural or synthetic rubber such as styrene butadiene thermoplastic rubber or polypropene rubber also are not desirable because they are not sufficiently transparent.

The layer 18 is made from a highly reflective, corrosion and abrasion-resistant metal, such as chromium. The metal is preferably applied by vacuum deposition techniques which bond the metal to the elastomeric film. Preferably, the reflective metal layer is deposited in a layer having a thickness of 0.01 mil or less, the metal layer being vacuum-deposited in discontinuous quantities, or separate planar reflective segments such as dots, which are discontinuous but which are deposited so close together that they give the optical visual effect of a continuous, highly reflective metallized surface.

A layer 20 of adhesive overlays the reflective metal layer 18 to provide means for adhering the laminate 10 to a substrate. The adhesive 20 is one which not only bonds to the metal layer 18, but also is a flexible permanently thermoplastic adhesive which will not disrupt the ability of the laminate to elastically deform and return to its original shape. In certain instances the layer of adhesive need not be provided when adherence to a substrate may be provided by other means described below.

To maximize the desired continuous bright reflective effect of the metallized layer 18, a variety of means can be used to reinforce the opacity of the metallized layer. For example, the adhesive layer 20 may include a black pigment, white pigment, or aluminum flakes to provide the necessary opaque undersurface for the reflective metal layer 18.

Figure 2:
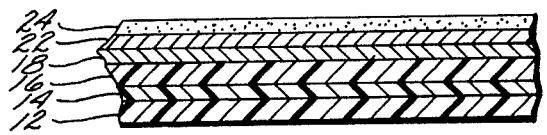
FIG. 2 is a fragmentary schematic cross-sectional elevation view showing a method of making an alternate embodiment of the laminate.

FIG. 2 shows an alternate elastomeric laminate 20 which includes an opaque layer 22 of a second vacuum-deposited metal such as tin, silver, or aluminum, for example. A layer 24 of a flexible adhesive is then coated on the opaque metal layer 22.

Figure 3:
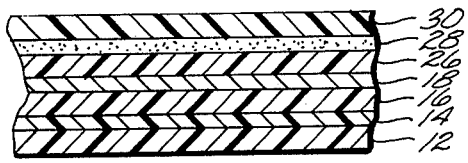
FIG. 3 is a fragmentary schematic cross-sectional elevation view showing a method of making a further alternate embodiment of the laminate.

FIG. 3 shows another alternate embodiment in which the opacity of the metal layer 18 is reinforced by an opaque layer 26 of pigment, such as a black pigment, white pigment, or aluminum flakes in a suitable liquid base coated over the layer 18. Preferably, such a pigmented opaque layer 26 is stretchable in much the same way as the elastomeric film 16. For example, the desired opaque pigment can be dispersed in a layer of a theremoplastic polyurethane coated over the metal layer 18. The pigment also can be dispersed in a suitable ethylene, vinyl, or acrylic rubber base for coating over the reflective metal layer.

The pigmented opaque layer 26 is then coated with a layer of adhesive 28. FIGS. 2 and 3 show the alternate types of adhesives which can be used. The adhesive 24 in FIG. 2 illustrates a heat-activated adhesive, and the adhesive layer 28 in FIG. 3 illustrates a pressure-sensitive adhesive having a release liner 30.

Figure 4:
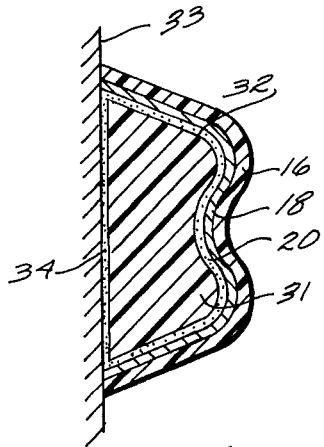
FIG. 4 is a fragmentary schematic cross-sectional elevation view showing the laminate of this invention bonded to a contoured outer surface of a substrate.

FIG. 4 illustrates one preferred use of the elastomeric laminate of this invention. The elastomeric film 16, together with the reflective metal layer 18, and the adhesive layer 20 are released from the carrier 12 (shown in FIG. 1) in preparation for being attached to the exterior surface of a substrate. The elastomeric film 16 can be stretched to conform to the three-dimensional shape of a contoured exterior surface of the substrate. The vapor-deposited metal layer 18, being applied in microscopic discontinuous dots, is capable of being distorted with the elastomeric film 16 to conform to the three-dimensional shape of the substrate, without disrupting the continuous, planar, highly reflective appearance of the metallized finish. The substrate to which the laminate is attached is illustrated in FIG. 4 as a rigid molded plastic article 31 having a three-dimensional contoured outer surface 32. For example, the plastic molded article can be scrollwork attached to the side 33 of an automobile by a layer 34 of a suitable bonding material. The laminate is bonded to the contoured surface 32 of the plastic trim strip so that the reflective metal layer 18 faces through the transparent elastomeric film 16 which acts as a protective outer covering for the metal layer. The adhesive layer 20 may be any permanent adhesive capable of bonding the metal layer 18 to the rigid plastic article. A vinyl coating such as Union Carbide's VMCH vinyl resin (copolymer of 85 to 88% vinyl chloride, 10.8 to 14.2% vinyl acetate, and 0.8 to 1.2% maleic acid), as well as many acrylic adhesives, can be used. Other means for bonding the laminate to a rigid plastic article will be described below.

Thus, the invention provides means for transferring highly reflective elastomeric metal surfaces to three-dimensional molded plastic articles, such as trim parts for automobiles. When used as trim parts for automobiles, the invention has advantages over chrome-plated metal trim parts in terms of reduced weight, less cumbersome and costly attachment techniques, and reduced corrosion.

Figure 5:
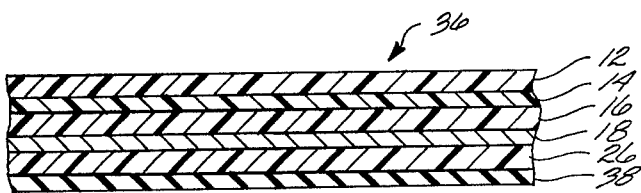
FIG. 5 is a fragmentary schematic cross-sectional elevation view showing the laminate of this invention in preparation for being bonded to the surface of an injection-molded article.

FIG. 5 shows an elastomeric laminate 36 which is similar to the laminate 10 in that it includes a transparent elastomeric film 16 coated onto the release liner 14 of the carrier sheet 12, and the reflective metal layer 18 vacuum-deposited on the elastomeric film 16. Opacity for the laminate 36 is provided by the above-described opaque layer 26, for example. In this form of the invention, a layer 38 of a primer material is coated over the opaque layer 26. The primer coat can be any material which bonds to the opaque layer 26, provides improved adherence between the laminate 36 and a substrate to which it is bonded, and has some degree of elasticity or flexibility. For example, if the laminate 36 is being bonded to a substrate made from urethane rubber, the primer layer 38 is desirably a material which is compatible with the urethane rubber and will become integrally bonded with it. A typical material for the primer layer is a permanently thermoplastic coating such as a polyurethane coating. Several other primers, or adhesives, applicable to elastomeric surfaces include natural rubber type adhesives, a thin vinyl coating used as a heat seal adhesive, and styrene butadiene rubber adhesives.

Figure 6:
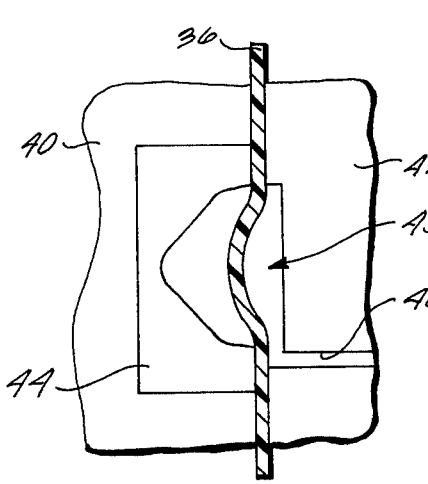
FIG. 6 is a fragmentary schematic cross-sectional elevation view showing an injection-molding machine in a closed position prior to injection-molding of a plastic molding compound against the laminate of this invention.
Figure 7:
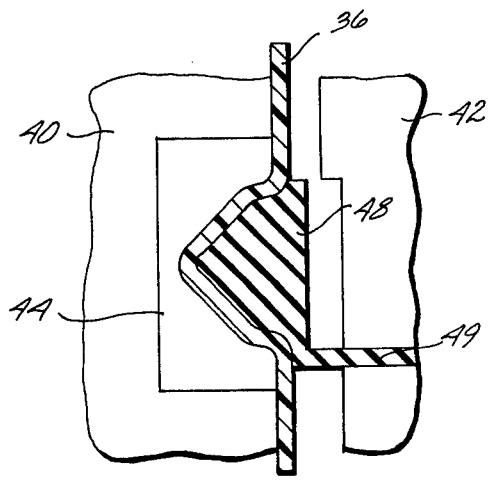
FIG. 7 is a fragmentary schematic cross-sectional elevation view similar to FIG. 6 showing the injection-molding machine in an open position after the molded article is injection-molded and prior to separating the article from the mold.

FIGS. 6 and 7 show a preferred means for integrally bonding the laminate 36 to an injection-molded article. The injection-molding machine includes a female mold 40 and a movable male mold 42. The female mold includes a recess which holds a die 44 having a mold surface in the reverse configuration of the article to be molded. The laminate 36 is initially placed across the mold surface of the die 44 and then the male mold 42 is forced into pressure contact with the outer edges of the laminate and the female mold to form a mold cavity 45. A heated plastic molding compound, which in this instance is urethane rubber, is forced into the mold cavity through a passageway 46 under high pressure against the primer layer 38 on the reverse face of the laminate 36. This stretches the laminate and forces it further into the mold cavity under relatively high pressure so that it conforms to the shape of the mold surface in the die 44. The result is a molded urethane rubber article 48 having an elastomeric reflective metal surface. The male mold 42 then is retracted, and the excess material, or sprue, shown at 49 is removed. The molded rubber article 48 is then separated from the mold cavity and the carrier sheet 12 is stripped from the face of the article.

A major use for the molded article 48 of this invention is in the elastomeric molded rubber bumpers used today in late-model automobiles. The molded article 48 can be an injection-molded automobile bumper made from urethane rubber, for example, having the elastomeric reflective metal laminate bonded to its front surface. The preferred metal layer is a highly reflective corrosion and abrasion-resistant metal, such as chromium or Nichrome. The vacuum-deposited metal layer is protected by the outer coating provided by the elastomeric film 16, which is preferably a transparent polyurethane film. When used as an impact-absorbing bumper for automobiles, the article 48 overcomes the objections to metal chrome-plated bumpers, such as their greater weight, reduced resistance to impact damage, and greater susceptibility to corrosion.

The article shown in FIG. 4 also can be injection-molded in much the same way as shown in FIGS. 6 and 7. In this instance, the adhesive layer 20 can be replaced with a primer layer which is compatible with the material from which the laminate and the molded article are made to control the bond between the injection-molded plastic and the metal or opaque layer of the laminate. Typical primer layers include thermoplastic polyurethane, ABS, or acrylic coatings, or Union Carbide's VMCH vinyl resin.

FIG. 8 shows an elastomeric laminate 50 in the form of a hot transfer sheet. Hot transfer sheets, or "hot stamp tape," is known in the decorative laminate art, and a typical hot stamp tape is disclosed in U.S. Pat. No. 3,666,516 to Dunning and owned by the assignee of this application. The hot transfer sheet 50 includes a transparent elastomeric film 16 coated onto a release layer 51 coated on the carrier sheet 12. The reflective metal layer 18 is vacuum-deposited onto the elastomeric film 16. Opacity for the laminate 50 is provided by the opaque layer 26, which can be in any of the forms described above. The layer 38 of primer is coated over the opaque layer 26 to improve the adherence between the laminate 50 and a substrate to which it is bonded.

The release coating 51 may be a wax or paraffin-based release coating which melts or softens at a temperature below that of the other layers in the laminate so that neither the carrier 12, nor the remainder of the laminate which is releasably attachable to the carrier, is melted or softened under the temperatures produced by the molding operation shown in FIGS. 9 or 10. The exception is that the surface of the primer layer 38 adjacent the substrate may be sufficiently softened or made sufficiently tacky to provide adherence to the substrate during the molding operation. A variety of release coats for such a hot transfer sheet can be used, and examples of typical release coats are shown in the Dunning U.S. Pat. No. 3,666,516 referred to above.

FIGS. 9 and 10 show a preferred means for integrally bonding the hot transfer sheet 50 to an injection-molded article. In FIGS. 9 and 10 the laminate 50 is represented schematically as a carrier layer 52 comprising the carrier 12 and the release coat 51, and a transferably decorative layer 54 which includes the transparent outer elastomeric sheet 16, the metallized layer 18, the opaque layer 26, and the primer layer 38. The laminate 50 is initially placed across the mold surface of the die 44, and the mold is forced into contact with the outer edges of the laminate and the female mold to form the mold cavity 45 in a manner identical to that described above in FIGS. 6 and 7. A heated plastic molding compound, such as urethane rubber, is forced under pressure into the mold cavity and against the reverse face of the laminate 50. The pressure of the injected molding compound stretches the laminate and forces it further into the mold cavity under relatively high pressure to conform to the shape of the mold surface in the die 44. The heat from the molding operation also is sufficiently high to melt or soften the release coating 51 so that when the male mold 42 is retracted, the carrier layer 52 releases from the transferable layer 54 which bonds to the front surface of the molded article in response to the heat and pressure of the molding operation. The molded article 56 is then separate from the mold cavity. The article 56 can serve as a variety of molded articles with reflective metal finishes, such as an impact-absorbing bumper for automobiles.

We claim:

1. A laminate for transferring a decorative metallized finish to a substrate comprising a substantially transparent, flexible and foldable, self-supporting elastomeric film of polyurethane material; a reflective metal layer bonded to a surface of the elastomeric film in microscopically discontinuous quantities in an amount which forms an apparent optically continuous reflective surface and which is elastically deformable in response to corresponding deformation of the elastomeric film; and an adherence layer on the side of the metal layer opposite the elastomeric film for adherently attaching the metal layer to a substrate so the elastomeric film provides a protective outer covering for the adherently attached reflective metal layer.

2. A laminate according to claim 1 in which the reflective metal layer is selected from the group consisting of chromium and alloys of chromium.

3. A laminate according to claim 1 in which the reflective metal layer is selected from the group consisting of chromium; nickel; alloys of chromium and nickel; alloys of chromium and iron; alloys of iron, nickel and chromium; aluminum; alloys of aluminum; antimony; tin; magnesium; indium; platinum; silver; rhodium; and palladium.

4. A laminate according to claim 1 including an opaque layer on a side of the reflective metal layer opposite the elastomeric film for reinforcing the opacity of the metal layer.

5. A laminate according to claim 4 in which the opaque layer is a substantially elastomeric layer of metal flakes.

6. A laminate according to claim 4 in which the opaque layer includes a stretchable layer of pigment material.

7. A laminate according to claim 4 in which the reflective metal layer is selected from the group consisting of chromium; nickel; alloys of chromium and nickel; alloys of chromium and iron; alloys of iron, nickel and chromium; aluminum; alloys of aluminum; antimony; tin; magnesium; indium; platinum; silver; rhodium; and palladium.

8. A laminate for transferring a decorative metallized finish to a substrate comprising a substantially transparent, flexible and foldable, self-supporting elastomeric film of polyurethane material; a reflective metal layer bonded to a surface of the polyurethane film in microscopically discontinuous quantities in an amount which forms an apparent optically continuous reflective surface and which is elastically deformable in response to corresponding deformation of the polyurethane film such that the metal layer retains its continuous, reflective appearance after being deformed; a substantially elastomeric layer of opaque material on a side of the metal layer opposite the polyurethane film for reinforcing the opacity of the metal layer; and a layer for adherently attaching the reflective metal layer to a substrate so the polyurethane film provides a protective outer covering for the adherently attached reflective metal layer.

9. A laminate according to claim 8 in which the reflective metal layer is selected from the group consisting of chromium; nickel; alloys of chromium and nickel;

alloys of chromium and iron; alloys of iron, nickel and chromium; aluminum; alloys of aluminum; antimony; tin; magnesium; indium; platinum; silver; rhodium; palladium; and mixtures thereof.

10. A laminate according to claim 8 in which the opaque layer comprises metal flakes.

11. A laminate according to claim 10 in which the metal flakes comprise aluminum pigment.

12. A laminate according to claim 10 in which the adherence layer comprises a flexible layer of adhesive.

* * * * *